US010071435B2

(12) United States Patent
Enyedy et al.

(10) Patent No.: US 10,071,435 B2
(45) Date of Patent: Sep. 11, 2018

(54) WELDER-GENERATOR WITH START-STOP

(71) Applicant: Lincoln Global, Inc., City of Industry, CA (US)

(72) Inventors: Edward A. Enyedy, Eastlake, OH (US); Andreu P. Meckler, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 312 days.

(21) Appl. No.: 15/153,797

(22) Filed: May 13, 2016

(65) Prior Publication Data
US 2017/0326670 A1 Nov. 16, 2017

(51) Int. Cl.
*B23K 9/10* (2006.01)
*F02N 11/08* (2006.01)

(52) U.S. Cl.
CPC .......... *B23K 9/1006* (2013.01); *B23K 9/1043* (2013.01); *F02N 11/0803* (2013.01); *F02N 11/0862* (2013.01)

(58) Field of Classification Search
CPC .......... B23K 9/06–9/07; B23K 9/095–9/0956; B23K 9/1006; B23K 9/1075
USPC .......................... 219/130.1, 133, 134, 137 PS
See application file for complete search history.

(56) References Cited

U.S. PATENT DOCUMENTS

| | | | |
|---|---|---|---|
| 6,310,321 B1 | 10/2001 | Beeson | |
| 6,348,671 B1 | 2/2002 | Fosbinder | |
| 6,674,179 B2 | 1/2004 | Beeson | |
| 7,211,764 B2 | 5/2007 | Leisner | |

(Continued)

FOREIGN PATENT DOCUMENTS

| | | |
|---|---|---|
| CN | 101743088 B | 7/2014 |
| EP | 2 454 045 | 5/2012 |

(Continued)

OTHER PUBLICATIONS

"Hybrid Generators", PMG DC Generators, can be located on the Internet at: http://www.dcdieselgenerator.com/hybrid-generators/, accessed on Aug. 26, 2015.

(Continued)

*Primary Examiner* — Michael Laflame, Jr.
(74) *Attorney, Agent, or Firm* — Brad Spencer

(57) ABSTRACT

An arc welding system includes a welding power supply. An auxiliary power supply supplies electrical energy to an auxiliary load. An engine-generator is connected to the welding power supply and auxiliary power supply. An engine starting battery is connected to the auxiliary power supply to supply electrical energy thereto during starting of the engine-generator. An auxiliary load sensor is configured to detect a presence of an electrical load on the auxiliary power supply. A speed sensor is configured to sense a speed of the engine-generator. A controller is configured to receive a signal indicating presence of the electrical load on the auxiliary power supply and a signal corresponding to speed of the engine-generator. When presence of the electrical load on the auxiliary power supply is detected, the controller starts the engine-generator, and after the engine-generator has reached a predetermined speed, switches the auxiliary power supply from the battery to the engine-generator.

20 Claims, 4 Drawing Sheets

(56) References Cited

U.S. PATENT DOCUMENTS

| | | | |
|---|---|---|---|
| 7,838,797 B2 | 11/2010 | Albrecht | |
| 8,080,761 B2 | 12/2011 | Matthews | |
| 8,405,001 B2 | 3/2013 | Albrecht | |
| 8,415,588 B2 | 4/2013 | Albrecht | |
| 8,558,139 B2 | 10/2013 | Albrecht | |
| 8,893,679 B2 | 11/2014 | Renner | |
| 9,796,037 B2 * | 10/2017 | Beeson | B23K 9/1056 |
| 2007/0181547 A1 | 8/2007 | Vogel | |
| 2010/0194118 A1 * | 8/2010 | Radtke | B23K 9/10 290/40 B |
| 2011/0114607 A1 | 5/2011 | Albrecht | |
| 2014/0054276 A1 | 2/2014 | Albrecht | |
| 2014/0263238 A1 | 9/2014 | Ulrich | |
| 2014/0332516 A1 | 11/2014 | Albrecht | |

FOREIGN PATENT DOCUMENTS

| | | |
|---|---|---|
| JP | 61-135479 A | 6/1986 |
| JP | 2009-255128 A | 11/2009 |
| WO | 2011/008377 A1 | 1/2011 |

OTHER PUBLICATIONS

"Hygen Hybrid Generator", Planetary Power, can be located on the Internet at: http://www.planetarypower.com/HyGen/, accessed on Aug. 26, 2015.

"Generators with Hybrid System", Inmesol Power Solutions, can be located on the Internet at: http://www.inmesol.com/hybrid-system/generator-sets-hybrid-system.asp, assessed on Aug. 26, 2015.

* cited by examiner

WELDER-GENERATOR WITH START-STOP

BACKGROUND OF THE INVENTION

Field of the Invention

The present invention relates to an arc welder powered by a generator and having an auxiliary power output for suppling electrical energy to auxiliary loads, such as lights, power tools, and the like.

Description of Related Art

Arc welding machines can be powered by engine-generators, allowing the arc welding machines to be operated independent of a source of utility power. Such arc welding machines can have auxiliary power outputs (e.g., outlets) that allow other electrical devices (auxiliary loads) to be operated. Certain auxiliary loads may operate intermittently, and it can be wasteful to keep the engine-generator running when an auxiliary load is off. To conserve fuel, the engine-generator can be turned off when the auxiliary load is not on or active; however, the engine-generator will then have to be turned back on when the auxiliary load is subsequently operational. It would be desirable to provide an arc welding system having an engine-generator and auxiliary outputs powered by the engine-generator, in which the engine-generator can be automatically started and stopped based on the power requirements of the auxiliary load.

BRIEF SUMMARY OF THE INVENTION

The following summary presents a simplified summary in order to provide a basic understanding of some aspects of the systems and methods discussed herein. This summary is not an extensive overview of the systems and methods discussed herein. It is not intended to identify critical elements or to delineate the scope of such systems and methods. Its sole purpose is to present some concepts in a simplified form as a prelude to the more detailed description that is presented later.

Example aspects and embodiments of the present invention are summarized below. It is to be appreciated that the example aspects and/or embodiments may be provided separately or in combination with one another.

In accordance with one aspect of the present invention, provided is an arc welding system. The system includes a welding power supply comprising a switching type power converter. A welding electrode is operatively connected to the switching type power converter to receive electrical energy from the switching type power converter and produce an electric arc from the arc welding system. An auxiliary power supply supplies electrical energy to an auxiliary load through an auxiliary power output of the arc welding system. An engine-generator is operatively connected to the welding power supply and the auxiliary power supply, to supply electrical energy to the welding power supply to produce the electric arc, and to supply further electrical energy to the auxiliary power supply. An engine starting battery is configured for starting the engine-generator. The engine starting battery is operatively connected to the auxiliary power supply to supply electrical energy to the auxiliary power supply during starting of the engine-generator. The engine starting battery is electrically isolated from the welding power supply so as not to supply electrical energy to the welding power supply to produce the electric arc. An auxiliary load sensor is configured to detect a presence of an electrical load on the auxiliary power supply and to output a signal indicating said presence of the electrical load on the auxiliary power supply. A speed sensor is configured to sense a speed of the engine-generator and to output a signal corresponding to the speed of the engine-generator. A controller is configured to receive the signal indicating said presence of the electrical load on the auxiliary power supply and the signal corresponding to the speed of the engine-generator. When said presence of the electrical load on the auxiliary power supply is detected, the controller automatically starts the engine-generator, and after the engine-generator has reached a predetermined speed, automatically switches the auxiliary power supply from the engine starting battery to the engine-generator.

In accordance with another aspect of the present invention, provided is an arc welding system. The system includes a welding power supply comprising a switching type power converter. A welding electrode is operatively connected to the switching type power converter to receive electrical energy from the switching type power converter and produce an electric arc from the arc welding system. An auxiliary power output supplies electrical energy to an auxiliary load. An engine-generator is operatively connected to the welding power supply and the auxiliary power output, to supply electrical energy to the welding power supply to produce the electric arc, and to supply further electrical energy to the auxiliary power output. An engine starting battery is configured for starting the engine-generator. The engine starting battery is operatively connected to supply electrical energy to the auxiliary power output during starting of the engine-generator. The engine starting battery is electrically isolated from the welding power supply so as not to supply electrical energy to the welding power supply to produce the electric arc. An auxiliary load sensor is configured to detect a presence of an electrical load on the auxiliary power output and to output a signal indicating said presence of the electrical load on the auxiliary power output. A speed sensor is configured to sense a speed of the engine-generator and to output a signal corresponding to the speed of the engine-generator. A controller is configured to receive the signal indicating said presence of the electrical load on the auxiliary power output and the signal corresponding to the speed of the engine-generator. When said presence of the electrical load on the auxiliary power output is detected, the controller automatically starts the engine-generator, and after the engine-generator has reached a predetermined operational condition, automatically switches the auxiliary power output from the engine starting battery to the engine-generator.

In accordance with another aspect of the present invention, provided is a non-hybrid arc welding system. The system includes a welding power supply comprising a switching type power converter. A welding electrode is operatively connected to the switching type power converter to receive electrical energy from the switching type power converter and produce an electric arc from the arc welding system. An auxiliary power output supplies electrical energy to an auxiliary load. An engine-generator is operatively connected to the welding power supply and the auxiliary power output, to supply electrical energy to the welding power supply to produce the electric arc, and to supply further electrical energy to the auxiliary power output. An engine starting battery is configured for starting the engine-generator. The engine starting battery is operatively connected to supply electrical energy to the auxiliary power output during starting of the engine-generator. The engine starting battery is electrically isolated from the welding power supply so as not to supply electrical energy to the welding power supply to produce the electric arc. An auxiliary load sensor is configured to detect a presence of an electrical load on the auxiliary power output and to output a signal indicating said presence of the electrical load on the auxiliary power output. A speed sensor is configured to sense a speed of the engine-generator and to output a signal corresponding to the speed of the engine-generator. A controller is configured to receive the signal indicating said presence of the electrical load on the auxiliary power output and the signal corresponding to the speed of the engine-generator. When said presence of the electrical load on the auxiliary power output is detected during a welding interlude, the controller automatically starts the engine-generator, and after the engine-generator has reached a predetermined speed, automatically switches the auxiliary power output from the engine starting battery to the engine-generator. When said presence of the electrical load on the auxiliary power output not detected during said or another welding interlude, the controller automatically stops the engine-generator.

DETAILED DESCRIPTION OF THE INVENTION

Figure 1:
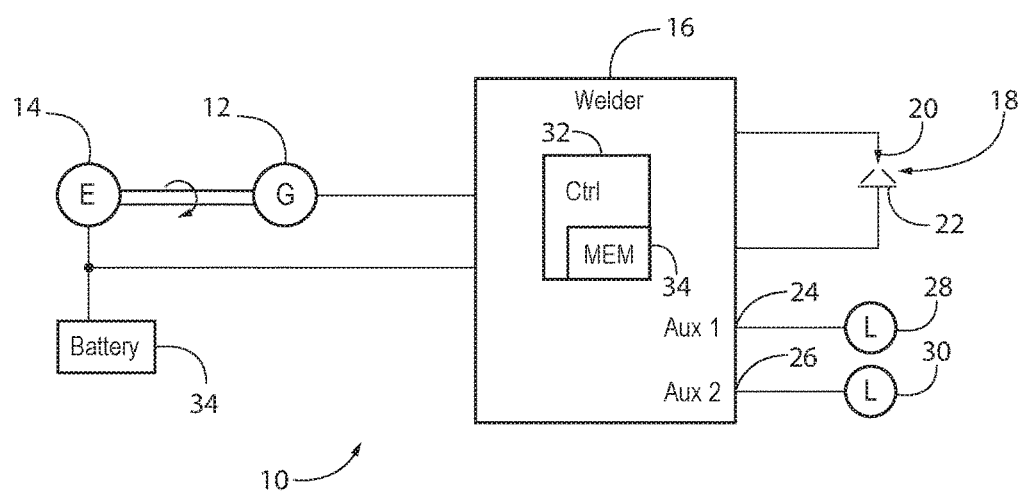
FIG. 1 is a schematic diagram of an example arc welding system.

The present invention relates to arc welders powered by an engine-generator and having one or more auxiliary power outputs for supplying electrical energy to auxiliary loads. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, the term "welding" refers to an arc welding process. Example arc welding processes include shielded metal arc welding (SMAW) (e.g., stick welding), flux cored arc welding (FCAW), and other welding processes such as gas metal arc welding (GMAW), gas tungsten arc welding (GTAW), and the like.

An example arc welding system 10 is shown schematically in FIG. 1. The welding system 10 includes a generator 12 driven by an engine 14 thereby forming an engine-generator. Example engines include diesel engines, gasoline engines, LP gas engines, and the like. The generator 12 generates electrical energy for powering a welding power supply 16 (hereinafter "welder"). The generator 12 can be a synchronous 3-phase alternator. However, the generator need not be a synchronous 3-phase alternator. For example, the generator could be a single phase alternator or a DC generator if desired. In certain embodiments, the generator 12 can have auxiliary windings for providing electrical power to auxiliary loads in addition to the welder 16.

The welder 16 includes circuitry for generating a welding waveform during arc welding. A welding operation is schematically shown in FIG. 1 as an electric arc 18 extending between a welding electrode 20 (consumable or non-consumable) and a workpiece 22.

The welder 16 also includes circuitry for providing AC or DC power to one or more auxiliary power outputs 24, 26 (e.g., Aux1 and Aux2 in FIG. 1). The auxiliary power outputs 24, 26 are typically powered by the generator 12 and provide electrical power to auxiliary loads 28, 30. Example auxiliary loads that can be powered by the welder 16 include tools, lights, pumps, chargers and the like.

The auxiliary power outputs 24, 26 can include appropriate outlets for facilitating connections to the auxiliary loads 28, 30. Example outlets include, for example, NEMA standard outlets commonly found in North America, CEE outlets commonly found in Europe, and other styles of outlets. The auxiliary power outputs 24, 26 can include multiple styles of outlets to readily accommodate use in different geographical locations around the world, or the welder 16 can include appropriate adapters to convert one style of outlet to another.

The output voltage at the auxiliary power outputs 24, 26 is provided by one or more inverters within the welder 16. The welder 16 includes a controller 32 that is operatively connected to the inverter(s) to control the characteristics (e.g., frequency and voltage level) of the output voltage at the auxiliary power outputs 24, 26. Through known pulse width modulation techniques, the controller 32 can provide different voltage levels and frequencies at the auxiliary power outputs 24, 26. For example, when used in North America, the auxiliary power outputs 24, 26 can be controlled to provide 60 Hz power at a desired voltage level (e.g., 120V, 240V etc.) When used in Europe, the auxiliary power outputs 24, 26 can be controlled to provide 50 Hz power at a desired voltage level (e.g., 220V). Other frequencies and voltages are possible. For example, when used at an airport, the auxiliary power outputs can be controlled to provide 400 Hz power at 120V.

The controller 32 can be an electronic controller and may include a processor. The controller 32 can include one or more of a microprocessor, a microcontroller, a digital signal processor (DSP), an application specific integrated circuit (ASIC), a field-programmable gate array (FPGA), discrete logic circuitry, or the like. The controller 32 can include a memory portion (e.g., RAM or ROM) storing program instructions that cause the controller to provide the functionality ascribed to it herein.

The arc welding system 10 includes an engine starting battery 34 for starting the engine 14. The engine 14 can be started automatically by the controller 32 or manually via appropriate user interface components on engine-generator or welder 16. In addition to being operatively connected to the engine 14 (e.g., connected to a starting motor attached to the engine), the starting battery 34 is also connected to the welder 16 to provide temporary power to the auxiliary power outputs 24, 26 while the engine 14 is starting and before the output voltage of the generator 12 has reached its proper magnitude and frequency.

The arc welding system 10 is a non-hybrid welding system. That is, the arc welding system is lacks a battery or bank of batteries for supplying electrical power for welding. The starting battery 34 is electrically isolated from a welding power supply within the welder 16 that generates the welding waveform. The starting battery 34 only supplies electrical power temporarily (e.g., while the engine is starting) to the auxiliary power outputs 24, 26, but does not supply power for arc welding.

The controller 32 is operatively connected to the welder 16, engine-generator, and optionally the battery (e.g., to monitor battery voltage, current, charge level, etc.) The controller 32 can determine when an auxiliary load 28, 30 requires power, such as when the auxiliary load turns on and draws current from the battery. If the engine-generator is currently OFF (not running) and an auxiliary load 28, 30 requires power, the controller 32 will automatically start the engine-generator by sending a start signal to the engine-generator. The engine-generator will generally come up to speed quickly, such as within 60 seconds, 30 seconds, 10 seconds etc., during which time the auxiliary loads will be supplied by the starting battery 34. When the engine-generator reaches a predetermined operation condition, such as a proper operating speed, generated voltage level and/or frequency, the controller 32 automatically switches the auxiliary power outputs 24, 26 from the starting battery 34 to the generator 12, such as by sending an appropriate command signal to an electronic or electromechanical switching device in the welder 16.

Some auxiliary loads 28, 30 can turn on automatically and intermittently, making manual activation of the engine-generator inconvenient. For example, if a liquid level-controlled pump (e.g., float switch activated sump pump) is connected to an auxiliary power output 24, 26, it may attempt to automatically turn on intermittently. If the engine-generator could not be automatically turned ON by the controller 32, the engine 14 could be left running to accommodate the intermittent load, thereby unnecessarily consuming fuel and generating exhaust gasses and noise. To avoid this, the controller 32 can sense that an auxiliary load 28, 30 is active and start the engine-generator. Moreover, the auxiliary load 28, 30 can be immediately powered by the starting battery 34 while the engine-generator comes up to speed, thereby avoiding a time lag between the auxiliary load requiring power and the welding system 10 being able to deliver power when the engine-generator is initially OFF.

During interludes between active welding operations (i.e. during welding interludes), the engine-generator can be turned OFF, ether manually or automatically. During such welding interludes, the auxiliary load 28, 30 may attempt to turn on, in which case the controller 32 can automatically start the engine-generator during the welding interludes, while the auxiliary load is temporarily powered by the starting battery 34. When the engine-generator reaches a predetermined speed (e.g., a predetermined RPM or generator output frequency), the controller automatically switches the auxiliary loads 28, 30 from starting battery power to generator power. The starting battery 34 will then be recharged while the engine 14 is operated, either by the generator 12 or by a separate alternator driven by the engine. When the auxiliary load 28, 30 turns off during a welding interlude, the controller 32 can sense that the auxiliary load is no longer consuming electrical power and automatically stop the engine 14. If the auxiliary load 28, 30 turns on during an active welding operation, the engine-generator should already be running, and the controller 32 would not attempt to start the engine 14.

Figure 2:
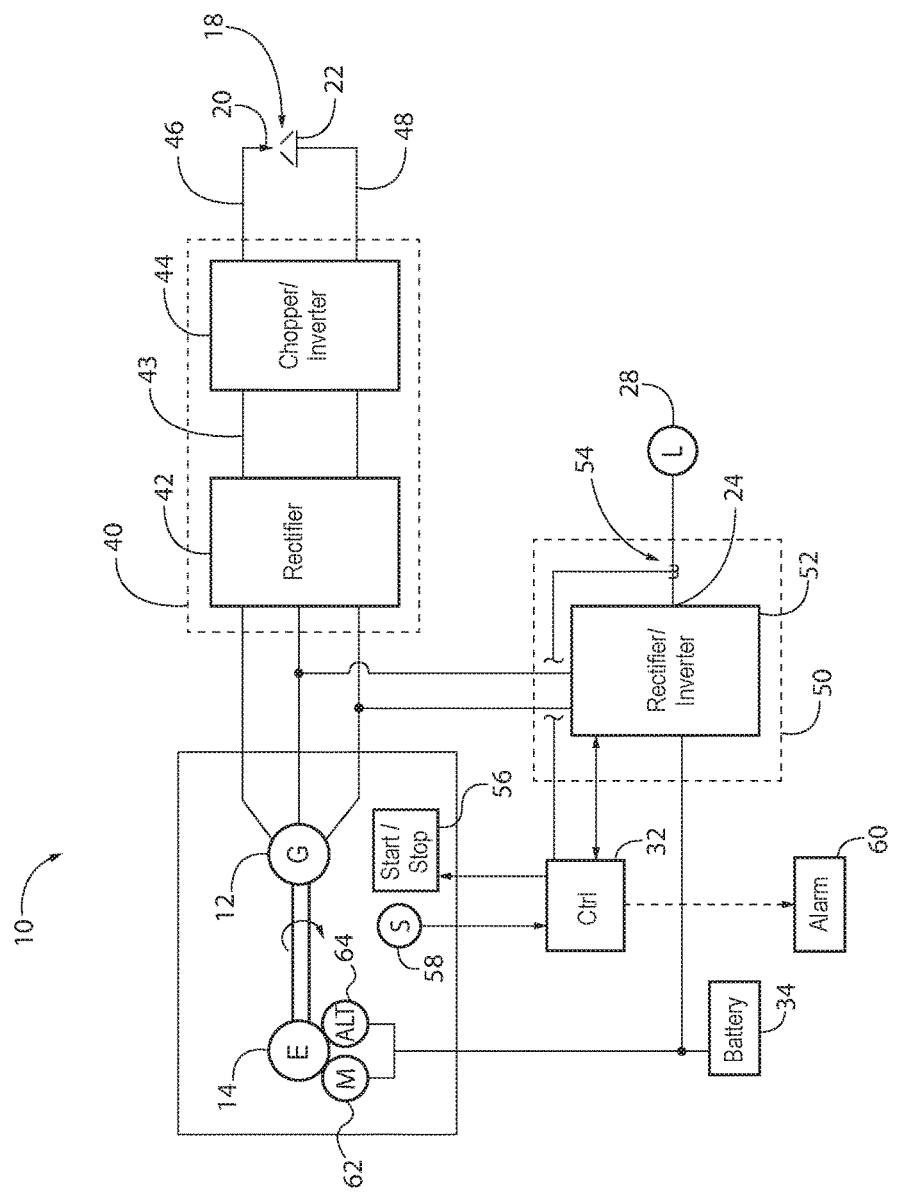
FIG. 2 is a schematic diagram of an example arc welding system.

FIG. 2 provides another schematic diagram of an example arc welding system 10 with additional details. Armature windings in the generator 12 supply electrical power to a switching type power converter 40 within the welder. Example switching type power converters include DC choppers, inverters, and the like. AC power from the generator is rectified by a rectifier 42 within the power converter 40. The DC output from the rectifier 42 supplies the welder's DC bus 43. The DC bus 43, in turn, supplies electrical power to a switching circuit, such as a chopper or inverter 44.

Electrical leads 46, 48 from the chopper/inverter 44 provide a completed circuit for the arc welding current. The arc welding current flows from the chopper/inverter 44 through the electrode 20, across the arc 18, and through the workpiece 22. The welding electrode 20 and workpiece 22 are operatively connected to the switching type power converter 40 via the electrical leads 46, 48. The welding electrode 20 receives electrical energy from the switching type power converter 40 (as supplied by the engine-generator) for producing the arc 18.

In certain embodiments, controller 32 is operatively connected to the switching type power converter 40 to provide control signals to the switching type power converter to control the welding waveform. The controller 32 can monitor various aspects of the welding process via feedback signals (e.g., welding current/voltage) and adjust welding parameters during arc welding accordingly.

The controller 32 is further operatively connected to an auxiliary power supply 50 for supplying electrical energy to the auxiliary load 28 through the auxiliary power output 24. The auxiliary power supply 50 can include a rectifier/inverter 52 for converting the AC electrical power received from the generator 12 and the DC electrical power received from the starting battery 34 into a desired output voltage (e.g. AC) and frequency for the auxiliary load 28. The auxiliary power supply 50 can include an auxiliary load sensor 54 that detects the presence of an electrical load on the auxiliary power supply 50. The auxiliary load sensor 54 outputs a signal to the controller 32 indicating the presence of the electrical load. In FIG. 2, the auxiliary load sensor is shown as a current transformer. However, other types of electrical load sensors could be used, or the auxiliary power supply 50 could directly communicate the existence of an auxiliary load to the controller, such as via digital communications, a contact closure, etc.

The controller 32 can control the starting and stopping of the generator 12 based on demand from the auxiliary load 28 as discussed above. In particular, the controller 32 can communicate with start/stop circuitry 56 in the engine-generator to control the operations of the generator 12. The engine-generator can include a speed sensor 58 (e.g., a tachometer) that senses the speed of the engine or generator and that outputs a corresponding signal to the controller 32. The controller 32 can compare the speed signal from the speed sensor 58 to a predetermined speed, to determine if the engine-generator has reached the desired operating speed. Rather than directly measuring RPM of the engine-generator, the speed sensor 58 could measure the output frequency of the generator, and the speed sensor could be located in either the engine-generator or the welder.

Once the engine-generator reaches the correct speed and/or produces the correct output voltage, the controller 32 can signal the rectifier/inverter 52 within the auxiliary power supply 50 to switch from battery power to generator power. In the example arc welding system 10 shown in FIG. 2, the auxiliary power output 24 is always supplied through the power electronics within the auxiliary power supply 50, rather than directly from the output of the generator. However, if desired, the welder could include appropriate switching circuitry, such as a contactor, for bypassing the rectifier/inverter 52, so that the auxiliary power output 24 is supplied directly from the generator 12.

The controller 32 automatically switches the auxiliary power supply 50 from the engine starting battery 34 to the engine-generator fairly quickly, such as within 60 seconds of starting the engine, within 30 seconds, within 10 seconds etc. If the engine-generator does not start within a predetermined time period (e.g., as noted above), or does not operate properly (e.g., no or low output voltage from the generator), the controller 32 can generate an alarm signal to provide a local or remote alarm 60 to alert a user.

FIG. 2 schematically shows a starting motor 62 and alternator 64 connected to the starting battery 34 and coupled to the engine 14. The starting motor 62 is energized by the battery 34 via appropriate control circuitry to start the engine 14. The alternator 64 is driven by the engine 14 to recharge the battery 62 and provide electrical power to other devices associated with the engine-generator and welder.

Figure 3:
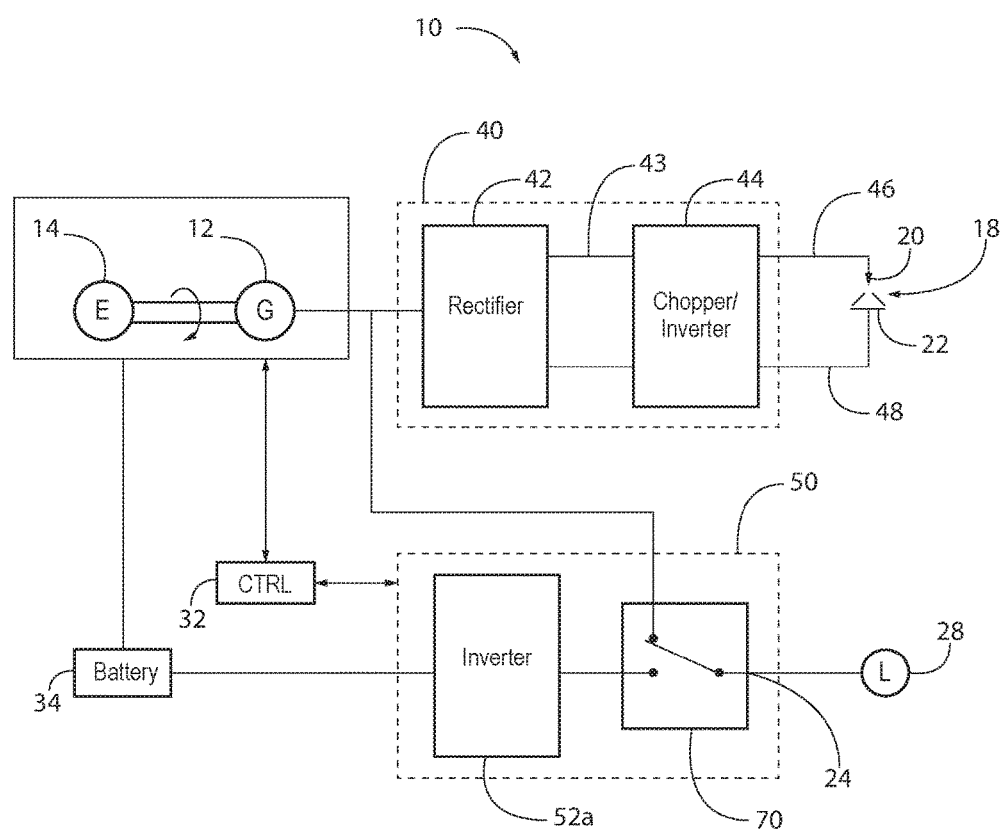
FIG. 3 is a schematic diagram of an example arc welding system.

FIG. 3 provides another schematic diagram of an example arc welding system 10. The output from the generator 12 is provided to the switching type power converter 40 and the auxiliary power supply 50. The auxiliary power supply 50 includes switching circuitry 70 for bypassing an inverter 52a. The operations of the switching circuitry 70 are controlled by the controller 32, so that the inverter 52a is bypassed and the auxiliary power output 24 is directly connected to the generator 12 when the engine-generator is running. During engine starting, the switching circuitry 70 connects the starting battery 34 to the auxiliary power output 24 through the inverter 52a.

Figure 4:
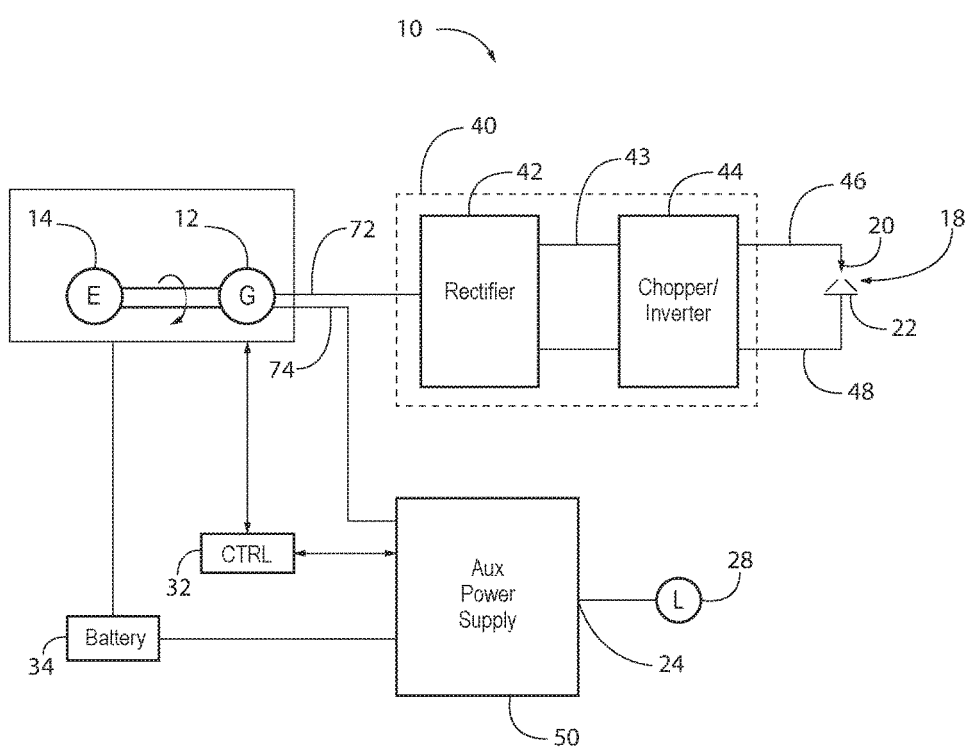
FIG. 4 is a schematic diagram of an example arc welding system.

FIG. 4 provides another schematic diagram of an example arc welding system 10. FIG. 4 schematically shows that the generator 12 can have separate outputs 72, 74 and armature windings for supplying power to the switching type power converter 40 and the auxiliary power supply 50. The generator 12 can have primary armature windings that supply single or three-phase power to the switching type power converter 40, and auxiliary windings that supply power to the auxiliary power supply 50.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An arc welding system, comprising:
  a welding power supply comprising a switching type power converter;
  a welding electrode operatively connected to the switching type power converter to receive electrical energy from the switching type power converter and produce an electric arc from the arc welding system;
  an auxiliary power supply for supplying electrical energy to an auxiliary load through an auxiliary power output of the arc welding system;
  an engine-generator operatively connected to the welding power supply and the auxiliary power supply, to supply electrical energy to the welding power supply to produce the electric arc, and to supply further electrical energy to the auxiliary power supply;
  an engine starting battery configured for starting the engine-generator, wherein the engine starting battery is operatively connected to the auxiliary power supply to supply electrical energy to the auxiliary power supply during starting of the engine-generator, wherein the engine starting battery is electrically isolated from the welding power supply so as not to supply electrical energy to the welding power supply to produce the electric arc;
  an auxiliary load sensor configured to detect a presence of an electrical load on the auxiliary power supply and to output a signal indicating said presence of the electrical load on the auxiliary power supply;
  a speed sensor configured to sense a speed of the engine-generator and to output a signal corresponding to the speed of the engine-generator; and
  a controller configured to receive the signal indicating said presence of the electrical load on the auxiliary power supply and the signal corresponding to the speed of the engine-generator, wherein, when said presence of the electrical load on the auxiliary power supply is detected, the controller automatically starts the engine-generator, and after the engine-generator has reached a predetermined speed, automatically switches the auxiliary power supply from the engine starting battery to the engine-generator.

2. The arc welding system of claim 1, wherein the engine-generator comprises an alternator operatively connected to the engine starting battery and configured to recharge the engine starting battery.

3. The arc welding system of claim 1, wherein the controller automatically switches the auxiliary power supply from the engine starting battery to the engine-generator within 60 seconds of the engine-generator starting.

4. The arc welding system of claim 1, wherein the controller automatically switches the auxiliary power supply from the engine starting battery to the engine-generator within 10 seconds of the engine-generator starting.

5. The arc welding system of claim 1, wherein the controller is configured to automatically stop the engine-generator when said presence of the electrical load on the auxiliary power supply is no longer detected.

6. The arc welding system of claim 1, wherein the controller is configured to generate an alarm when the engine-generator fails to start within a predetermined time period.

7. The arc welding system of claim 1, wherein the auxiliary power supply comprises in inverter, and the engine-generator supplies electrical energy to the auxiliary load through the inverter.

8. An arc welding system, comprising:
  a welding power supply comprising a switching type power converter;
  a welding electrode operatively connected to the switching type power converter to receive electrical energy from the switching type power converter and produce an electric arc from the arc welding system;
  an auxiliary power output for supplying electrical energy to an auxiliary load;
  an engine-generator operatively connected to the welding power supply and the auxiliary power output, to supply electrical energy to the welding power supply to produce the electric arc, and to supply further electrical energy to the auxiliary power output;
  an engine starting battery configured for starting the engine-generator, wherein the engine starting battery is operatively connected to supply electrical energy to the auxiliary power output during starting of the engine-generator, wherein the engine starting battery is electrically isolated from the welding power supply so as not to supply electrical energy to the welding power supply to produce the electric arc;

an auxiliary load sensor configured to detect a presence of an electrical load on the auxiliary power output and to output a signal indicating said presence of the electrical load on the auxiliary power output;

a speed sensor configured to sense a speed of the engine-generator and to output a signal corresponding to the speed of the engine-generator; and a controller configured to receive the signal indicating said presence of the electrical load on the auxiliary power output and the signal corresponding to the speed of the engine-generator, wherein, when said presence of the electrical load on the auxiliary power output is detected, the controller automatically starts the engine-generator, and after the engine-generator has reached a predetermined operational condition, automatically switches the auxiliary power output from the engine starting battery to the engine-generator.

9. The arc welding system of claim 8, wherein the engine-generator comprises an alternator operatively connected to the engine starting battery and configured to recharge the engine starting battery.

10. The arc welding system of claim 8, wherein the controller automatically switches the auxiliary power output from the engine starting battery to the engine-generator within 60 seconds of the engine-generator starting.

11. The arc welding system of claim 8, wherein the controller automatically switches the auxiliary power output from the engine starting battery to the engine-generator within 10 seconds of the engine-generator starting.

12. The arc welding system of claim 8, wherein the controller is configured to automatically stop the engine-generator when said presence of the electrical load on the auxiliary power output is no longer detected.

13. The arc welding system of claim 8, wherein the controller is configured to generate an alarm when the engine-generator fails to start within a predetermined time period.

14. The arc welding system of claim 8, further comprising an inverter operatively connected between the engine starting battery and the auxiliary power output, for converting a DC voltage from the engine starting battery to an AC voltage, wherein the arc welding system is configured to supply electrical energy directly from the engine-generator to the auxiliary power output thereby bypassing the inverter.

15. A non-hybrid arc welding system, comprising:

a welding power supply comprising a switching type power converter;

a welding electrode operatively connected to the switching type power converter to receive electrical energy from the switching type power converter and produce an electric arc from the arc welding system;

an auxiliary power output for supplying electrical energy to an auxiliary load;

an engine-generator operatively connected to the welding power supply and the auxiliary power output, to supply electrical energy to the welding power supply to produce the electric arc, and to supply further electrical energy to the auxiliary power output;

an engine starting battery configured for starting the engine-generator, wherein the engine starting battery is operatively connected to supply electrical energy to the auxiliary power output during starting of the engine-generator, and the engine starting battery does not to supply electrical energy to the welding power supply to produce the electric arc;

an auxiliary load sensor configured to detect a presence of an electrical load on the auxiliary power output and to output a signal indicating said presence of the electrical load on the auxiliary power output;

a speed sensor configured to sense a speed of the engine-generator and to output a signal corresponding to the speed of the engine-generator; and a controller configured to receive the signal indicating said presence of the electrical load on the auxiliary power output and the signal corresponding to the speed of the engine-generator, wherein, when said presence of the electrical load on the auxiliary power output is detected during a welding interlude, the controller automatically starts the engine-generator, and after the engine-generator has reached a predetermined speed, automatically switches the auxiliary power output from the engine starting battery to the engine-generator, and wherein when said presence of the electrical load on the auxiliary power output not detected during said or another welding interlude, the controller automatically stops the engine-generator.

16. The arc welding system of claim 15, wherein the speed of the engine-generator sensed by the speed sensor comprises a frequency of the electrical energy supplied by the engine-generator.

17. The arc welding system of claim 15, wherein the controller automatically switches the auxiliary power output from the engine starting battery to the engine-generator within 60 seconds of the engine-generator starting.

18. The arc welding system of claim 15, wherein the controller automatically switches the auxiliary power output from the engine starting battery to the engine-generator within 10 seconds of the engine-generator starting.

19. The arc welding system of claim 15, wherein the controller is configured to generate an alarm when the engine-generator fails to start within a predetermined time period.

20. The arc welding system of claim 15, further comprising an inverter operatively connected between the engine starting battery and the auxiliary power output, for converting a DC voltage from the engine starting battery to an AC voltage, wherein the engine-generator supplies electrical energy to the auxiliary load through the inverter.

* * * * *